United States Patent
Xu et al.

(10) Patent No.: US 9,757,710 B1
(45) Date of Patent: Sep. 12, 2017

(54) SOLVENT-SUPPORTED COMPACTION OF METAL-ORGANIC FRAMEWORKS

(71) Applicant: Ford Global Technologies, LLC, Dearborn, MI (US)

(72) Inventors: Chunchuan Xu, Troy, MI (US); Justin Purewal, Ann Arbor, MI (US); Michael J. Veenstra, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/241,467

(22) Filed: Aug. 19, 2016

(51) Int. Cl.
  *B01J 20/22* (2006.01)
  *B01J 20/28* (2006.01)
  *B01J 20/30* (2006.01)
  *C01B 3/00* (2006.01)
  *C10L 3/06* (2006.01)

(52) U.S. Cl.
  CPC ....... *B01J 20/226* (2013.01); *B01J 20/28014* (2013.01); *B01J 20/28064* (2013.01); *B01J 20/28066* (2013.01); *B01J 20/305* (2013.01); *B01J 20/3035* (2013.01); *C01B 3/0084* (2013.01); *C10L 3/06* (2013.01); *C10L 2290/542* (2013.01)

(58) Field of Classification Search
  CPC .... B01J 20/22; B01J 20/226; B01J 20/28014; B01J 20/28064
  USPC .......................................................... 502/401
  See application file for complete search history.

(56) References Cited

U.S. PATENT DOCUMENTS

| | | |
|---|---|---|
| 6,893,564 B2 | 5/2005 | Mueller et al. |
| 8,703,644 B2 | 4/2014 | Gaab et al. |
| 9,302,258 B2 | 4/2016 | Chang et al. |
| 2014/0208650 A1 | 7/2014 | Gaab et al. |

FOREIGN PATENT DOCUMENTS

WO  2015189599 A1  12/2015

*Primary Examiner* — Edward Johnson
(74) *Attorney, Agent, or Firm* — Damian Porcari; Brooks Kushman P.C.

(57) ABSTRACT

Methods of forming a high surface area compacted MOF powder are disclosed, as well as MOF pellets formed thereby. The method may include synthesizing a metal organic framework (MOF) powder using a first solvent, exchanging the first solvent with a second solvent such that pores of the MOF powder are at least 10% filled with the second solvent, compacting the MOF powder having pores at least 10% filled with the second solvent into a pellet, and desolvating the compacted pellet to remove the second solvent. The pellet may maintain a specific surface area after compacting that is at least 80% its initial specific surface area. Compacting the MOF powder with a solvent at least partially filling its pores may prevent or reduce crushing of the MOF pore structure and maintain surface area, for example, for hydrogen or natural gas storage.

20 Claims, 3 Drawing Sheets

US 9,757,710 B1

SOLVENT-SUPPORTED COMPACTION OF METAL-ORGANIC FRAMEWORKS

TECHNICAL FIELD

The present disclosure relates to solvent-supported compaction of metal-organic frameworks (MOFs), for example, mechanical compaction of said solvent-supported MOFs.

BACKGROUND

Metal-organic frameworks (MOFs) are synthetic materials which can possess very high specific surface areas (e.g., exceeding 3000 $m^2/g$). These high surface areas may make them useful for gas storage applications, for example, as hydrogen storage materials for fuel cell vehicles or methane storage materials for natural gas vehicles. The performance of these adsorbent materials may be highly dependent on the surface area based on the attraction of the gas to the surface due to Van Der Waals forces. Monolithic solids are generally superior for on-board gas storage applications (compared to powder) since they typically have greater total volumetric storage density, enhanced thermal properties, and improved ease of handling. However, bulk synthesis of MOFs generally results in a powder form of the material. It is possible to form MOFs into high-density pellets using mechanical compaction without a binder. However, mechanical compaction is known to reduce the micropore volume of the MOFs, due to pore collapse, pore blockage, and amorphization of crystal structure. This typically reduces the storage capacity of the MOFs, and limits the usefulness of densifying the MOF adsorbent.

SUMMARY

In at least one embodiment, a method is provided. The method may include synthesizing a metal organic framework (MOF) powder using a first solvent; exchanging the first solvent with a second solvent such that pores of the MOF powder are at least 10% filled with the second solvent; compacting the MOF powder having pores at least 10% filled with the second solvent into a pellet; and desolvating the compacted pellet to remove the second solvent.

In one embodiment, the MOF powder is compacted to a density of at least 60% of a theoretical density of the MOF crystal structure to form the pellet. The pellet may maintain a specific surface area after compacting that is at least 80% or 90% of an initial specific surface area of the pellet before compacting. In one embodiment, the pellet maintains a specific surface area after compacting of at least 80% compared to a pre-compacted specific surface area. The second solvent may have a lower boiling point than the first solvent. In one embodiment, the second solvent includes methanol, acetone, dichloromethane, ethanol, or water. The MOF powder may be dried using a flowing gas between the exchanging step and the compacting step. Desolvating the compacted pellet to remove the second solvent may include heating the pellet to at least a boiling point of the second solvent. In one embodiment, desolvating the compacted pellet to remove the second solvent further includes applying a vacuum to the compacted pellet.

In at least one embodiment, a method is provided. The method may include exchanging a first solvent in pores of a metal organic framework (MOF) powder with a second solvent having a lower boiling point than the first solvent, such that the pores of the MOF powder are at least 10% filled with the second solvent; compacting the MOF powder having at least 10% filled pores into a pellet; and desolvating the compacted pellet to remove the second solvent.

The MOF powder may be compacted to a density of at least 65% of a theoretical density of the MOF crystal structure to form the pellet. In one embodiment, the pellet maintains a specific surface area after compacting that is at least 80% or 90% of an initial specific surface area of the pellet before compacting. The pellet may maintain a specific surface area after compacting of at least 1,400 $m^2/g$. In one embodiment, the pores of the MOF powder are at least 50% filled with the second solvent after the exchanging step and during the compacting step.

In at least one embodiment, a gas storage material is provided. The material may include a compacted pellet of metal organic framework (MOF) powder. The pellet may have a density of at least 60% of a theoretical density of the MOF crystal structure and a specific surface area of at least 1,000 $m^2/g$. The specific surface area of the compacted pellet may be at least 80% of a specific surface area of the MOF powder in a non-compacted state.

In one embodiment, the specific surface area of the compacted pellet is at least 90% of a specific surface area of the MOF powder in a non-compacted state. The compacted pellet may have a specific surface area of at least 1,400 $m^2/g$. In one embodiment, the compacted pellet does not include a binder.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
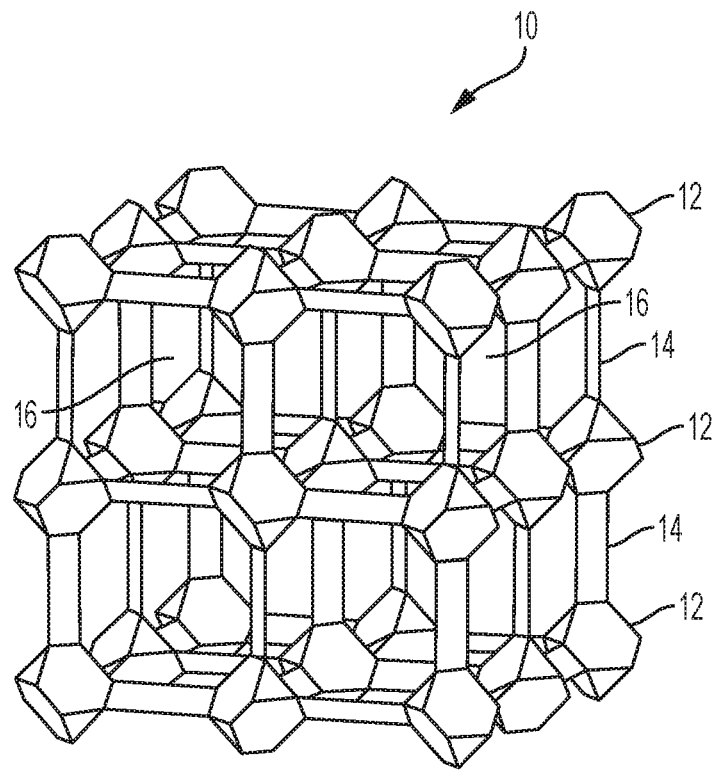
FIG. 1 is a schematic perspective view of one example of a metal-organic framework (MOF) structure.

With reference to FIG. 1, a schematic model of a metal-organic framework (MOF) 10 is shown. The MOF 10 may have a lattice or crystal structure or repeating units. A MOF generally includes metal ions or clusters 12 joined by organic linkers 14. The framework or lattice forms pores or openings 16 between the clusters 12 and organic linkers 14. The lattice framework of clusters 12, linkers 14, and pores 16 may provide the MOF 10 with a very high specific surface area, for example, 3,000 $m^2/g$ or more. This high specific surface area makes MOFs an attractive option for hydrogen and/or natural gas adsorption, as well as other gaseous storage and collection applications. The size and/or shape of the pores 16 may change depending on the specific MOF composition. In the embodiment shown, the pores are generally cubic or rectangular prism (e.g., having a square or rectangular cross-section), however, other pore shapes are also possible. For example, the pores 16 may have a hexagonal cross-section, octagonal cross-section, or irregular cross-section. The MOF 10 shown in FIG. 1 is merely one example of a MOF structure. One type of MOF having the illustrated structure is MOF-5, which has zinc oxide ($ZnO_4$) clusters linked by terephthalate (1,4 benzenedicarboxylate). Other examples of MOFs may include MOF-74, MOF-177, MOF-200, MOF-210, and others. Various MOF compositions are known in the art and the disclosed solvent-supported compaction method may be applied to any suitable MOF.

The conventional synthesis process for MOFs typically involves combining metal salts with organic linkers (e.g., carboxylic acids). These reactants are usually dissolved together and stirred in a polar organic solvent such as N,N-diethylformamide (DEF) or N,N-dimethylformamide (DMF). MOF crystallites then form via self-assembly, precipitate from solution, and are subsequently filtered and dried to form a powder. Following synthesis, the MOF pores remain filled with the solvent molecules (e.g., DEF or DMF), which stabilize the pore structure. To activate the MOF pore volume, the occluded solvent molecules are exchanged with a lower boiling point and/or lower surface tension solvent, such as acetone, which is subsequently evacuated by heating the MOF powder under dynamic vacuum. After activation, the MOF powder is compressed or compacted to form a pellet.

It has been discovered that this conventional approach of 1) synthesizing, 2) activating, and 3) compacting may result in a significant loss of micropore volume and specific surface area in the MOF. Without being held to any particular theory, it is believed that the lattice or framework structure of the MOF may be damaged or crushed during the compaction, thereby reducing the porosity and specific surface area of the MOF due to pore collapse. In some instances, the density of the compacted MOF powder may approach the single crystal density of the MOF composition.

In at least one embodiment, a method of compacting MOFs is disclosed that reduces or prevents pore collapse and maintains high specific surface area at high pellet density. The method may include compacting the MOF while it is solvated (e.g., while solvent molecules are present in the MOF pores 16) and prior to activation. This is in contrast to the conventional approach described above, in which the MOF powder is fully dried and activated (i.e., desolvated) by heating under vacuum prior to compaction. Without being held to any particular theory, it is believed that the solvent molecules may support the crystalline pore structure of the MOF during the compaction process, thereby resisting damage or crushing of the pores.

Figure 2:
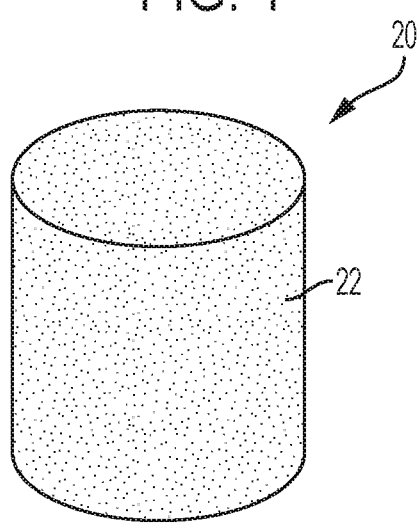
FIG. 2 is a perspective view of a compacted pellet of MOF powder, according at an embodiment.
Figure 3:
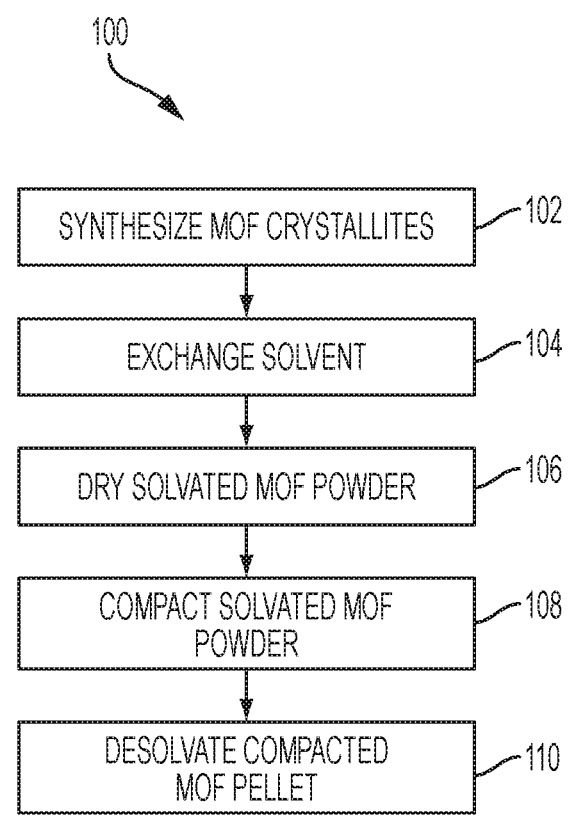
FIG. 3 is an example of a flowchart of a method of forming a compacted MOF powder pellet, according to an embodiment.

With reference to FIGS. 2-3, a pellet 20 of compacted MOF and a flowchart 100 of a method of forming the pellet 20 are shown. The pellet 20 may include compressed or compacted MOF powder 22. In at least one embodiment, the pellet 20 may be formed without a binder (e.g., it may consist essentially of only MOF powder). However, in other embodiments a binder may be present. The pellet 20 may be formed by pressing or compacting in a mold. The final density of the pellet 20 may depend on the pressure applied, the size of the pellet, the shape of the pellet, the pellet composition, etc. In one embodiment, the final density of the pellet 20 may be at least 0.7 $g/cm^3$, for example, at least 0.75 $g/cm^3$, 0.8 $g/cm^3$, or 0.85 $g/cm^3$. The pellet 20 is shown as a cylinder, however, any suitable shape may be formed. Other non-limiting examples of pellet shapes may include cubes, rectangular prisms, spheres, or others.

The final density of the pellet may also be expressed in terms of the percent of the theoretical density of the MOF crystal structure (referred to herein as the crystal density). Different MOF compositions may have different crystal densities, for example, Ni-MOF-74 may have a crystal density of 1.195 $g/cm^3$. Accordingly, a percentage of the crystal density may provide a normalized indication of the final density of the pellet compared to the initial non-compacted state (e.g., powder). In one embodiment, the final density of the pellet 20 after pressing/compaction may be at least 55%, for example, at least 60%, 65%, 70%, 75%, or 80%.

The compacted pellet 20 may retain a very high specific surface area compared to the MOF powder or the pellet prior to compaction. For example, the specific surface area (e.g., Langmuir surface area) of the compacted pellet may be at least 80% of the initial specific surface area of the pellet (e.g., prior to compaction). In one embodiment, the specific surface area of the compacted pellet may be at least 85%, at least 90%, at least 93%, or at least 95% of the initial specific surface area of the pellet. The exact specific surface area (e.g., per unit weight) of the non-compacted and compacted pellet may vary depending on the composition of the MOF, the preparation or processing parameters, or other factors. However, in at least one embodiment, the pellets formed by the disclosed method may have a specific surface area (e.g., Langmuir surface area) of at least 1,000 $m^2/g$ at a pellet density of 0.75 $g/cm^3$. For example, the pellets formed by the disclosed method may have a specific surface area of at least 1,200 $m^2/g$ or at least 1,400 $m^2/g$ at a pellet density of 0.75 $g/cm^3$. In another embodiment, the pellets formed by the disclosed method may have the same specific surface areas at a pellet density greater than 0.75 $g/cm^3$, such as at least 0.8 $g/cm^3$ or at least 0.85 $g/cm^3$.

With reference to FIG. 3, a flowchart 100 is shown describing an embodiment of a method of forming the pellet 20. In step 102, MOF crystallites are synthesized. The MOF may have any suitable MOF composition, such as MOF-5, MOF-74, or others. MOF-5 generally includes zinc oxide ($ZnO_4$) clusters linked by terephthalate (1,4 benzenedicarboxylate). MOF-74 generally includes metal clusters linked by 2,5-dioxido-1,4-benzenedicarboxylate. The metal clusters may be provided by a metal source, such as a metal salt. Examples of metals may include cobalt, magnesium, nickel, zinc, or others. Other MOFs known in the art may also be used, such as MOF-177, MOF-200, MOF-210, or others. Various MOF compositions are known in the art and the disclosed solvent-supported compaction method may be applied to any suitable MOF. The MOF may be synthesized by combining a metal salt or salts with an organic linker (e.g., a carboxylic acid). The components may be dissolved together in a polar organic solvent, such as DEF, DMF, or others, depending on the MOF composition, and may be stirred. MOF crystallites may then form by self-assembly and may precipitate from solution. The crystallites may then be filtered from the solution and dried to form a powder. The MOF powder may still include the polar organic solvent in the pores of the crystal/lattice structure.

In step 104, the polar organic solvent that is still present in the pores from step 102 may be replaced or exchanged with a second, different solvent. The second solvent may be a more volatile solvent (e.g., lower boiling point) than the first solvent, such as methanol, acetone, dichloromethane, ethanol, water (e.g., purified—DI, RO, etc.), or others. The second solvent may be exchanged with the original solvent using any suitable method. For example, the MOF powder may be immersed or soaked in the second solvent for an extended period of time. The MOF powder may be re-filtered and washed with the second solvent, optionally multiple times.

In step 106, the solvated MOF powder from step 104 may be dried such that it is able to be processed and compacted. Processing may include homogenizing or mixing with a binder and/or an additive that improves heat/mass transfer characteristics of the final compacted pellet. However, while the powder may be dried, it retains the second solvent within the pores of the MOF crystallites such that the pores are at least partially occluded or filled with the solvent. The second solvent may be present in an amount/volume sufficient to support the pore structure of the MOF during compaction. For example, the pores of the MOF may be at least 10%, 25%, 50%, 75%, or 90% filled or occluded with the second solvent (e.g., by volume). In another embodiment, the pores of the MOF may be completely, or substantially completely filled with the second solvent (e.g., at least 99%). The percentages above may represent the amount filled of the total pore volume or the percent filled of the individual pores. In one embodiment, the solvated powder may be dried by a flowing gas, for example, an inert or non-reactive gas, such as nitrogen or argon, or other gases, such as air. The flowing gas may be at room temperature. Other drying methods may also be used, provided they do not heat the MOF powder to a temperature above the boiling point of the second solvent. Accordingly, step 106 may result in a MOF powder that is dried but still includes the second solvent (e.g., methanol) within the pores of the MOF crystallites.

In step 108, the still-solvated MOF powder from step 106 may be pressed or compacted, for example, into a pellet (e.g., such as pellet 20). The powder may be deposited into a mold and pressed to a certain density or final size or it may be pressed using a certain force/pressure. In one embodiment, the pellet may be pressed to a density of at least 0.7 g/cm$^3$, for example, at least 0.75 g/cm$^3$, 0.8 g/cm$^3$, or 0.85 g/cm$^3$. The compaction may include uniaxial pressing or pressing from multiple directions.

Without being held to any particular theory, it is believed that pressing or compacting the solvated MOF powder may maintain a high porosity and specific surface area in the finished, compacted pellet compared to the original, non-compacted powder (e.g., at the loose powder density, such as less than 0.6 g/cm$^3$). In conventional pellet processing, the pellet is activated prior to pressing, such that the pores are essentially empty or do not include a solvent during the pressing step. It is believed that at least a portion of these unsupported pores are crushed during the pressing step, thereby reducing the specific surface area and porosity of the finished pellet. However, in the disclosed method, some or all of the pores of the MOF powder may still be partially or completely occluded or filled with the second solvent during the pressing step. The solvent may therefore support the pore structure during the pressing step and prevent or reduce the damage (e.g., crushing) to the pores during compaction.

In step 110, the pressed MOF pellet may be desolvated to remove the second solvent from the pores. The solvent may be removed using any suitable method. In one embodiment, the MOF pellet may be desolvated by heating it to a temperature above the boiling point of the second solvent and maintaining the elevated temperature for a time sufficient to remove the trapped solvent. In another embodiment, the pellet may be subjected to a reduced air pressure, such as a vacuum, to remove the solvent from the pellet. In another embodiment, both heat and reduced pressure (e.g., vacuum) may be applied to the pellet to remove the solvent. Other activation methods may include heating the solvent-exchanged MOF under a flowing inert gas, such as $N_2$ or Ar, supercritical $CO_2$ extraction, or others. After removal of the solvent, the MOF pellet may be activated and ready for use in applications such as gas storage (e.g., hydrogen or natural gas).

Variables such as the solvent type, solvent concentration, drying procedure, and activation procedure (e.g., vacuum heating) may affect the mechanical integrity of the pellet and may be tailored to the particular MOF composition used in the pellet. For example, if the powder is not sufficiently dried before the compaction step, the pellet may shrink and/or form cracks during the activation step. The mass of the solvent may therefore be monitored during the process to ascertain the level of dryness. An example of a mechanical property that may be affected by the above variables is the radial crush strength (e.g., as described in ASTM D4179-01).

Figure 4:
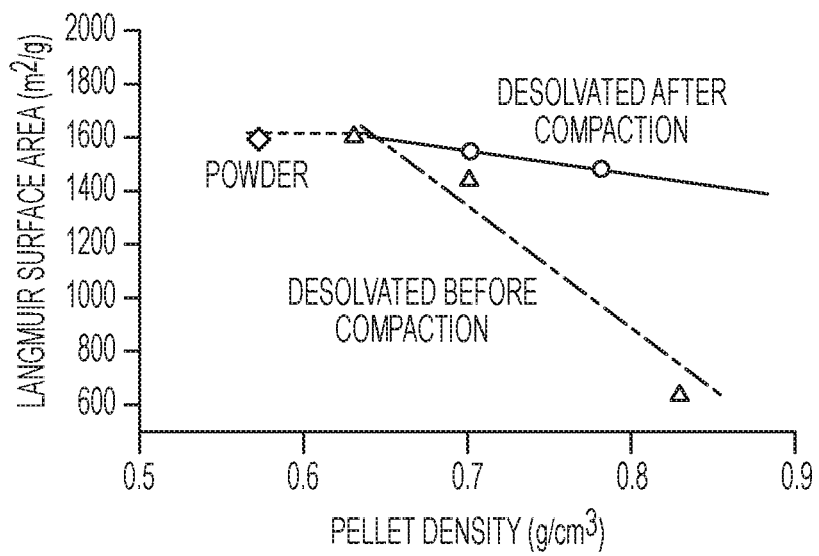
FIG. 4 is experimental data showing the specific surface area of a MOF powder pellet formed according to the conventional process and an embodiment of the disclosed process.
Figure 5:
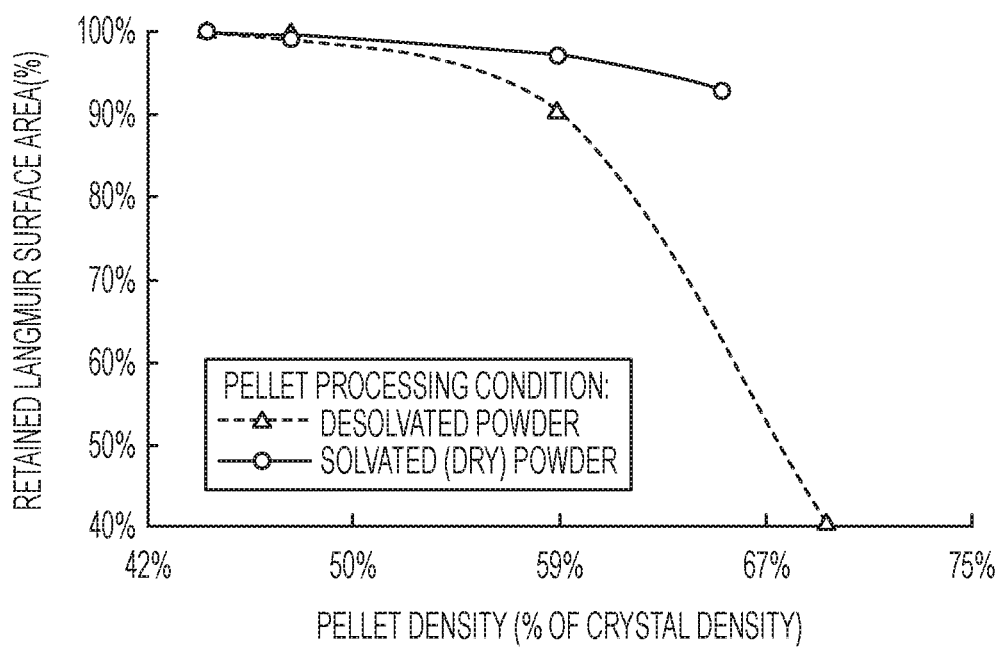
FIG. 5 is experimental data showing the percent retained specific surface area of the MOF powder pellet of FIG. 4 as a function of crystal density.

With reference to FIGS. 4 and 5, experimental data is shown comparing the specific surface area of a conventionally formed pellet (desolvated prior to compaction) to a pellet formed according to the present disclosure (desolvated after compaction). The MOF used for the comparison was $Ni_2$(dobc) (dobc$^{4-}$=2,5-dioxido-1,4-benzenedicarboxylate), abbreviated as Ni-MOF-74. The synthesis of Ni-MOF-74 was carried out in DMF solvent, and the solvent molecules initially occupied the pores. The DMF was then exchanged with methanol, a more volatile solvent. The MOF powder was then dried using flowing $N_2$ gas such that it was dried enough for processing and compaction, but remained solvated in the pores. The solvated Ni-MOF-74 was then mechanically compacted into a pellet with the methanol solvent still present in the pores. The pellet was subsequently activated by vacuum heating. The reference pellet was formed using the conventional method wherein the MOF powder was fully activated (e.g., all solvent removed) prior to processing and compaction.

The Langmuir surface areas of the two pellets at different densities are shown in FIG. 4. FIG. 5 shows the percentage of the surface area that is retained as the density increases as a function of crystal density. Accordingly, FIG. 5 is normalized based on the specific surface area and density of Ni-MOF-74. As shown in triangle markers, the pellet formed using the conventional process has a steep decline in the specific surface area as the density of the pellet increases. Once the pellet density exceeds 0.8 g/cm$^3$, the pellet has lost more than 50% of its specific surface area compared to the non-compacted powder. In contrast, the disclosed pellet formed by solvated compaction shows very little reduction in specific surface area with increased density. As shown by the circular markers, the pellet formed using the disclosed process maintains almost all of its specific surface area at high densities (e.g., at least 85% or 90%) compared to the non-compacted MOF powder (e.g., less than 0.6 g/cm$^3$). In addition to retaining most of its specific surface area, the pellet formed according to the disclosed methods also retains its mechanical integrity during the final activation step, even though it may lose up to 15% of its mass as the second solvent (e.g., methanol) is removed.

The disclosed methods may be used to form MOF pellets that may be used for hydrogen, natural gas, or other gaseous storage and collection applications. For example, the pellets formed by the claimed methods may be used to store hydrogen for use in hydrogen fuel cells. The fuel cells may be used to power any machine or system, such as a hydrogen powered vehicle. One or more of the pellets may be included in a gas storage system, which may include one or more tanks or chambers having the pellets disposed therein. The storage system may then be included in a larger system, such as a hydrogen powered vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method, comprising:
    synthesizing a metal organic framework (MOF) powder using a first solvent;
    exchanging the first solvent with a second solvent such that pores of the MOF powder are at least 10% filled with the second solvent;
    compacting the MOF powder having pores at least 10% filled with the second solvent into a pellet; and
    desolvating the compacted pellet to remove the second solvent.

2. The method of claim 1, wherein the MOF powder is compacted to a density of at least 60% of a theoretical density of the MOF crystal structure to form the pellet.

3. The method of claim 2, wherein the pellet maintains a specific surface area after compacting that is at least 80% of an initial specific surface area of the pellet before compacting.

4. The method of claim 2, wherein the pellet maintains a specific surface area after compacting that is at least 90% of an initial specific surface area of the pellet before compacting.

5. The method of claim 2, wherein the pellet maintains a specific surface area after compacting of at least 80% compared to a pre-compacted specific surface area.

6. The method of claim 1, wherein the second solvent has a lower boiling point than the first solvent.

7. The method of claim 1, wherein the second solvent includes methanol, acetone, dichloromethane, ethanol, or water.

8. The method of claim 1, wherein the MOF powder is dried using a flowing gas between the exchanging step and the compacting step.

9. The method of claim 1, wherein desolvating the compacted pellet to remove the second solvent includes heating the pellet to at least a boiling point of the second solvent.

10. The method of claim 9, wherein desolvating the compacted pellet to remove the second solvent further includes applying a vacuum to the compacted pellet.

11. A method, comprising:
    exchanging a first solvent in pores of a metal organic framework (MOF) powder with a second solvent having a lower boiling point than the first solvent, such that the pores of the MOF powder are at least 10% filled with the second solvent;
    compacting the MOF powder having at least 10% filled pores into a pellet; and
    desolvating the compacted pellet to remove the second solvent.

12. The method of claim 11, wherein the MOF powder is compacted to a density of at least 65% of a theoretical density of the MOF crystal structure to form the pellet.

13. The method of claim 12, wherein the pellet maintains a specific surface area after compacting that is at least 80% of an initial specific surface area of the pellet before compacting.

14. The method of claim 12, wherein the pellet maintains a specific surface area after compacting that is at least 90% of an initial specific surface area of the pellet before compacting.

15. The method of claim 12, wherein the pellet maintains a specific surface area after compacting of at least 1,400 $m^2/g$.

16. The method of claim 12, wherein the pores of the MOF powder are at least 50% filled with the second solvent after the exchanging step and during the compacting step.

17. A gas storage material, comprising:
    a compacted pellet of metal organic framework (MOF) powder, the pellet having a density of at least 60% of a theoretical density of the MOF crystal structure and a specific surface area of at least 1,000 $m^2/g$, the specific surface area of the compacted pellet being at least 80% of a specific surface area of the MOF powder in a non-compacted state.

18. The gas storage material of claim 17, wherein the specific surface area of the compacted pellet is at least 90% of a specific surface area of the MOF powder in a non-compacted state.

19. The gas storage material of claim 17, wherein the compacted pellet has a specific surface area of at least 1,400 $m^2/g$.

20. The gas storage material of claim 17, wherein the compacted pellet does not include a binder.

* * * * *